United States Patent [19]
Long

[11] 4,113,890
[45] Sep. 12, 1978

[54] METHOD OF COOKING A FLOWABLE FOOD PRODUCT IN A CONTINUOUS FLOW SCRAPED SURFACE HEAT EXCHANGER

[75] Inventor: Marshall Long, Leawood, Kans.

[73] Assignee: Marlen Research Corporation, Overland Park, Kans.

[21] Appl. No.: 841,890

[22] Filed: Oct. 13, 1977

Related U.S. Application Data

[63] Continuation-in-part of Ser. No. 639,659, Dec. 11, 1975, abandoned.

[51] Int. Cl.² .................. A22C 11/04; A01J 25/13; B08B 9/04
[52] U.S. Cl. ........................... 426/512; 15/3.5; 15/104.06 A; 99/355; 165/95; 264/172; 426/513; 426/515; 426/516
[58] Field of Search .................. 165/94, 95, 156; 15/3.5, 3.51, 104.06 A; 99/355; 426/512, 513, 515, 516, 517, 520, 523, 524; 264/149, 172

[56] References Cited

U.S. PATENT DOCUMENTS

| 516,206 | 3/1894 | Kellegren | 165/156 |
|---|---|---|---|
| 2,599,493 | 6/1952 | Slaughter | 264/149 |
| 2,995,451 | 8/1961 | Leach | 426/520 X |
| 3,135,322 | 6/1964 | Neugebauer | 165/95 X |
| 3,259,179 | 7/1966 | Leach | 165/95 |
| 3,288,163 | 11/1966 | Craven | 15/3.51 |
| 3,502,018 | 3/1970 | Keszler | 99/355 |
| 3,541,837 | 11/1970 | Davis et al. | 15/104.06 A |
| 3,638,554 | 2/1972 | Ackroyd | 426/524 |
| 3,707,442 | 12/1972 | Takahashi et al. | 165/95 X |
| 3,730,229 | 5/1973 | D'Onofrio | 165/156 X |
| 3,889,013 | 6/1975 | Moule | 426/516 X |
| 3,895,085 | 7/1975 | Suzuki et al. | 264/172 |

FOREIGN PATENT DOCUMENTS 1,525,512  12/1969  Fed. Rep. of Germany ............ 165/95

Primary Examiner—S. Leon Bashore
Assistant Examiner—Steve Alvo
Attorney, Agent, or Firm—Schmidt, Johnson, Hovey & Williams

[57] ABSTRACT

A flowable food product or other substance is heated or chilled by pumping it through a long, slender tube on a continuous basis in one direction only while simultaneously subjecting it to a temperature differential. The body of product contained within and moving through the tube is segmented into a number of discrete, end-to-end but longitudinally spaced-apart sections by plugs that are periodically introduced into the tube and moved along with the product. The plugs continuously scrape the wall of the tube free of any accumulation of frost or cooked-on material without interrupting the continuous flow and without subjecting the product to deleterious shear stresses. The frequency of plug insertion can be varied without changing the rate of product flow along the wall of the tube so that the best combination of temperature, speed, and scraping frequency can be achieved for each product formulation on a custom basis. The temperature differential may be created by guiding a heat exchange medium around the tube in a helical pattern and in counterflow relationship to the advancing product. As an alternative, microwave energy may be used alone or in conjunction with a fluid medium.

7 Claims, 5 Drawing Figures

METHOD OF COOKING A FLOWABLE FOOD PRODUCT IN A CONTINUOUS FLOW SCRAPED SURFACE HEAT EXCHANGER

CROSS-REFERENCE

This is a continuation-in-part of my copending application "Continuous Flow Scraped Surface Heat Exchanger," Ser. No. 639,659, filed Dec. 11, 1975 and now abandoned.

The invention relates to the processing of a flowable substance, such as a food product, by conducting the substance through a long, preferably coiled tube during which the substance is subjected to a heat exchange operation to either chill the substance or to heat it to the extent desired. More particularly, it relates to a way of cooking or chilling the substance in a long, heat exchange tube while at the same time continuously scraping the inside walls of the tube to remove any adhered material which might lower the quality of the finished product.

While scraping the interior walls of a cooking or chilling vessel during processing is not new per se (see, for example, U.S. Pat. No. 2,995,451 to Leach, illustrating a reciprocating "shuttle scraper"), the relatively large diameter chambers of such vessels present poor environments for efficient heat transfer. Under those conditions the ratio of heat transfer surface area of the vessel to product volume is relatively small, which leads to insufficient temperature change taking place near the center of the product. If the product is being cooked and it is attempted to correct the problem by simply increasing the temperature of the heat exchange surface, then the tendency is for the product to become caramelized quite quickly at its interface with the surface in spite of the presence of the scraper. In the event that the product is being chilled, decreasing the temperature of the heat exchange surface beyond a certain point only increases the frost buildup on the surface faster than it can be scraped off. Moreover, in many present scraped heat exchange vessels, the product is repeatedly subjected to pushing and pulling in alternate directions through restricted orifices, which subjects the product to substantial shear stresses that can severely damage the product and decrease its salability.

Accordingly, one important object of the present invention is to eliminate and avoid the problems of prior scraped heat exchange processes by advancing the product continuously but in discrete segments or sections through a long, slender heat exchange tube where the product sections are separated by scraping plugs that maintain the walls of the tube free of frost or cooked-on matter as they move through the tube with the product.

A further important object of the invention is to provide the flexibility of being able to individually adjust the temperature, flow rate and frequency of scraping so as to obtain the combination of these variables that is the most ideally suited for the particular product formulation being processed.

Another important object of this invention is to provide for the foregoing in connection with many diverse types of substances and products such as, for example, vegetable and meat stews, milk and cheese sauces, macaroni, and sausages.

An additional important object is to provide a processing method which is equally adaptable for either cooking or chilling products, although having particular utility for cooking.

Figure 4:
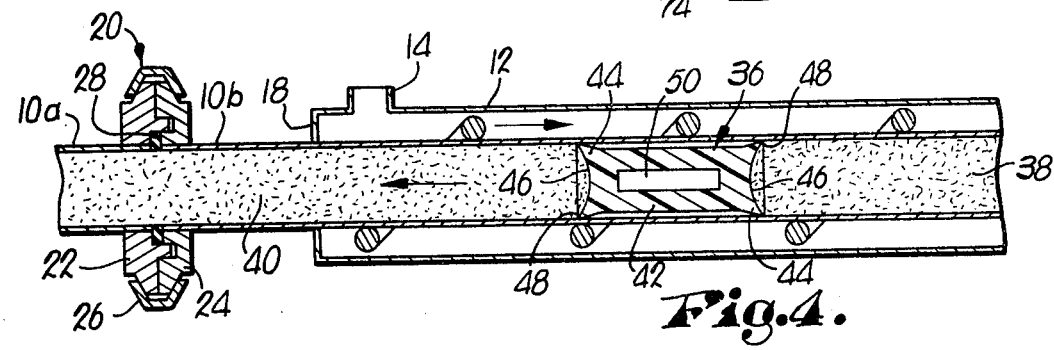
Figure 5:
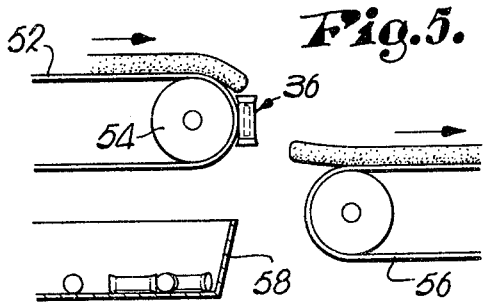

FIG. 4 is an enlarged, fragmentary cross-sectional view through a portion of the system showing details of construction and illustrating the manner in which the substance being processed is divided into discrete sections by the plugs; and FIG. 5 is a diagrammatic view on a reduced scale of the discharge end of the system illustrating one manner in which the plugs may be separated from the finished product.

Figure 1:
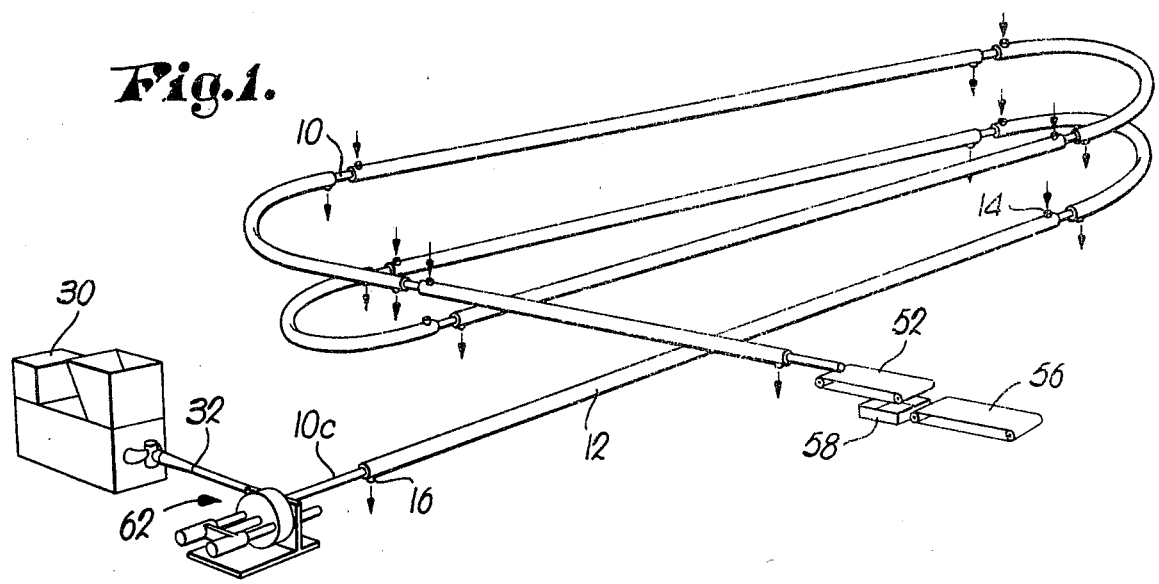
FIG. 1 is a schematic perspective view of a processing system capable of carrying out the method of the present invention.

As illustrated in FIG. 1, the system capable of practicing the principles of the present invention should include a long, slender, jacketed tube 10 which may be conveniently formed into a number of coils in order to reduce the overall area occupied by the system. Tube 10 may be constructed from stainless steel, which in many instances is preferred, because of its excellent heat transfer properties and the rigid confines it provides for the substance passing through tube 10, or the latter may be constructed of a suitable thermoplastic resin. In either event, the tube 10 is provided with a number of identical, hollow jackets 12 disposed around the latter at spaced intervals, each jacket 12 representing an individual flow system for a heat exchange medium separate and apart from the systems of other jackets 12. In this regard, each jacket 12 has its own inlet 14 and outlet 16, and its opposite ends 18 are closed to prevent comingling of the medium in one jacket 12 with that of another. The temperature of the medium for each of the jackets 12 may be selected in accordance with the nature of the product being processed.

The continuous tube 10 may be fabricated from a number of shorter lengths of tube placed end-to-end as illustrated by lengths 10a and 10b in FIG. 4, in which case lengths 10a and 10b may be attached to one another through the use of a suitable fastener 20. Fastener 20 may take the form of a pair of outer, circumferential, mating pieces 22 and 24, each fixed to its respecitive length 10a or 10b, which are held together by common peripheral ring 26 in clamping engagement with a gasket 28 located between the proximal edges of lengths 10a and 10b.

When the body of flowable substance is pumped through tube 10, such as by a continuous stuffing machine 30 in FIG. 1 whose pumping rate may be adjusted by means not shown but well-understood by those skilled in the art and which feeds the substance to tube 10 through line 32, the substance moves from left to right viewing FIG. 1 and from right to left viewing FIG. 4. On the other hand, the heat transfer medium introduced into the jackets 12 is moved counter to the direction of travel of the substance. This counterflow relationship of medium and substance is carried out over the entire length of tube 10 and has the benefit of assuring that the substance will be progressively and yet gently brought up or down to the desired temperature. Further, it assures that a substantially uniform temperature differential will exist throughout the processing cycle. For example, where the medium flowing through a jacket 12 is steam or hot water, it will be appreciated that the medium progressively decreases in temperature as outlet 16 is approached, due to the fact that by the time the medium has reached outlet 16 it has lost a large amount of its heat to the substance moving in the opposite direction. Thus, the substance encounters the lowest temperature first and is gently brought up toward the temperature existing adjacent inlet 14. Because the substance always encounters a uniform temperature differential, it will be continuously subjected to sufficient heat to raise its temperature to the desired level.

It has been found also that swirling the heat transfer medium around the tube 10 as the medium is flowed through jacket 12 produces a more efficient heat transfer. For this purpose, then, a continuous helical guide 34 may be employed in each jacket 12 around the corresponding portion of tube 10 to limit the heat transfer medium to such a helical path of travel.

It is possible that during advancement of the substance through the tube 10 some heat transfer-induced buildup may tend to occur along the inner surface of the wall of tube 10. For example, if the substance is to be chilled by flowing cold heat exchange medium through the jackets 12, the tendency is for frost to form inside the tube 10. On the other hand, if jackets 12 carry hot water, steam or other hot medium for heating or cooking the substance, the tendency is for the substance to caramelize and adhere to tube 10 along its inner surface. In either instance, such buildup reduces the heat exchange efficiency of tube 10 and thereby unnecessarily draws out the heat exchange process, makes it more expensive because of wasted energy and, in the case of caramelization, necessitates periodic cleaning of the tube 10 to maintain the highest standards of sanitation. Another consideration is, of course, that such caramelization or "burn-on" detracts from the palatability and appearance of the substance where it is a food product, thus diminishing its consumer appeal.

Accordingly, pursuant to the present invention, the body of the substance or product moving through tube 10 at any one time is discretely segmented, and the various segments of the body, while being aligned end-to-end throughout the tube 10, are maintained spaced-apart between such ends by plugs 36 such as illustrated in FIG. 4. These plugs 36 are designed to travel with the substance as it moves through tube 10 and to maintain the latter separated into multiple segments or sections such as the sections designated 38 and 40 in FIG. 4. Furthermore, the plugs 36 are designed to scrape the inside surface of tube 10 as they and the body move through the tube 10. Consequently, without interrupting the continuous cooking or chilling process being carried out on the substance, periodic scraping and cleaning of tube 10 is effected as the plugs 36 move through the latter at spaced intervals between the discrete sections.

Preferably, the plugs 36 are shaped as illustrated in FIG. 4, each having a central portion 42 of reduced diameter relative to tube 10 and a pair of opposite end portions 44 which are flared outwardly to conform quite closely to the inside diameter of the tube 10. In this respect, the end portions 44 should be close enough to the diameter of tube 10 to effect the positive scraping action that is desired and to assure that a tight seal is created such that the body of substance is not able to seep around end portions 44 and thereby disrupt or reduce the rate of continuous flow through tube 10 when pressure is applied to the system.

Plugs 36 may thus be conveniently constructed from a suitable plastic material (such as Nylon or Teflon) that is resistant to extreme heat and cold such as might be encountered during the process and during sanitizing. Desirably, the opposite end faces 46 of each plug 36 are concave so as to present annular edges 48 that are capable of flexing to as limited extent in order to provide the degree of engagement with tube 10 necessary to assure proper scraping and sealing.

It is also contemplated that each plug 36 may be provided with a ferrous insert 50 so as to facilitate separation of plugs 36 from the body of substance at the discharge end of the system. For example, FIGS. 1 and 5 illustrate that a conveyor 52 may be utilized to receive the processed substance as it issues from tube 10 at the end of the system. A magnetic roller 54 may be provided in conjunction with conveyor 52 so that the plugs 36 adhere to conveyor 52 while moving around roller 54 as illustrated in FIG. 5, although the processed substance is free to continue forwardly onto a second conveyor 56. As the plugs 36 move on around roller 54 and start along the lower stretch of conveyor 52, they simply drop off into a receptacle 58.

Figure 2:
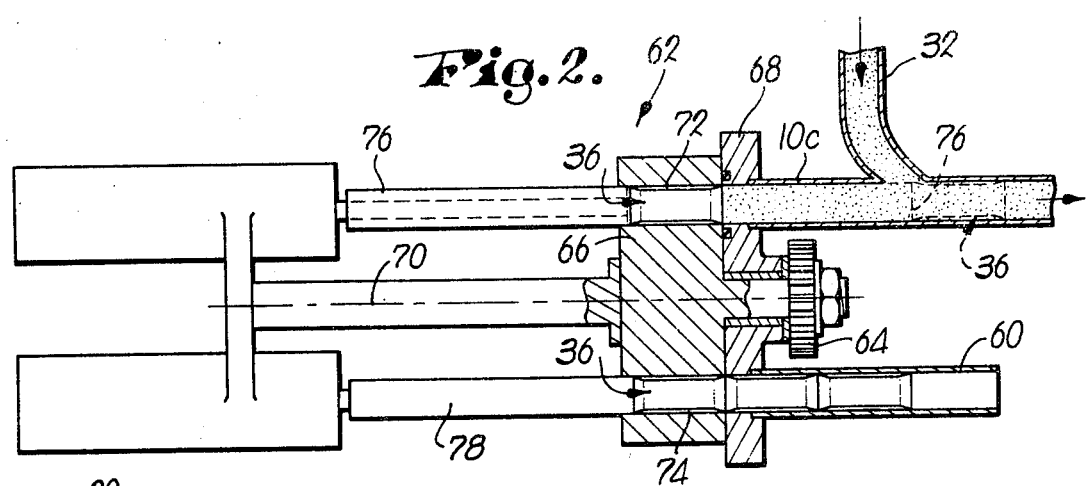
FIG. 2 is an enlarged, fragmentary cross-sectional view at the entry end of the system illustrating one manner in which the spacing and scraping plugs used in conjunction with the present method may be automatically loaded into the system.
Figure 3:
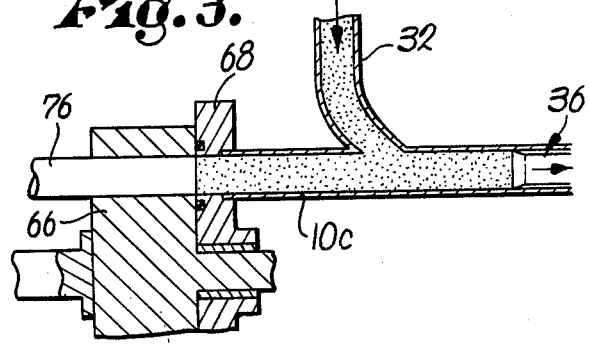
FIG. 3 is a fragmentary view similar to FIG. 2, but showing conditions in the system immediately following insertion of a plug.

The plugs 36 may be loaded either manually or automatically at the entry end of the system, and one way of accomplishing automatic loading is illustrated in detail in FIGS. 2 and 3. After the plugs 36 have been retrieved at the discharge end of the system they may be sanitized and then inserted successively into a supply line 60 which feeds the automatic loader 62. Loader 62 is constructed in the nature of a turret for rotation by a gear 64 drivingly engaged by a suitable source of power (not shown) that is capable of adjustment so as to permit selective variance of the speed of rotation of the gear 64. A head 66 of the loader 62 wipes against a perforated plate 68 which receives the plug supply line 60 on one side of the axis of rotation 70 of loader 62 and the initial stretch 10c of tube 10 on the opposite side of the axis 70.

A pair of diametrically opposed cylinders 72 and 74 in head 66 are alternately brought into registration with supply line 60 and tube stretch 10c as the loader 62 is rotatively indexed so that a plug 36 can be received in cylinder 74 from line 60 at the same time another plug 36 is ready to be ejected from the cylinder 72 into tube stretch 10c.

Hydraulic rams 76 and 78 of loader 62 may be reciprocated between retracted and extended positions as illustrated by the ram 76 in FIG. 2, wherein its retracted position is shown in solid lines and its extended position is indicated by dashed lines. The frequency of operation of the rams 76, 78 is coordinated with the speed of rotation of gear 64 and head 66 so that proper timing is achieved and so that the frequency of plug introduction into tube 10 may be adjusted by adjusting the driven speed of gear 64. Note that when retracted, the ram 76 provides room for its plug 36 to be fully received within cylinder 72 so as not to interfere with rotation of head 66 relative to plate 68, while when extended, ram 76 projects at least to the point where the fresh substance enters tube stretch 10a from line 32.

The result of this construction is that a plug 36 may be loaded into cylinder 74 against the retracted ram 78 while the ram 76 pushes its plug 36 out of cylinder 72 and into tube stretch 10c to a point adjacent line 32. As ram 76 retracts, more substance is delivered under pressure into tube stretch 10 through line 32 such that the loaded plug is pushed forwardly into other parts of the system, while a certain amount of the substance follows the retracting ram 76 to fill the area of tube stretch 10c being vacated by ram 76. This is illustrated in FIG. 3 which shows the condition of pertinent components immediately following insertion of a plug 36 and after the ram 76 has retracted to the interface between head 66 and plate 68. Ram 76 remains in this position as the entire loader 62 is indexed about axis 70 to bring the cylinder 74 and ram 78 into alignment with tube stretch 10c, while cylinder 72 and ram 76 are brought into alignment with line 60. Thereupon, ram 76 is retracted further to accept the next plug 36 within cylinder 72, while ram 78 is extended to load its plug 36 into tube stretch 10c.

This operation is repeated many times over throughout the course of the processing operation and is controlled by the desired frequency of plugs 36 within tube 10. Depending upon the nature of the substance being processed and the type of process being carried out, the interval between plugs 36 within tube 10 may vary considerably, even though the flow rate might remain constant or be changed from product to product. For example, if the substance being processed is a cream or cheese sauce which is to be completely cooked during its travel through tube 10, the frequency of plugs 36 should be fairly high compared to that which would be necessary if the substance were a beef and vegetable stew flowing at the same rate as the sauce. Similarly, if these products were to be less than fully cooked so as to be subjected to lower temperatures than incurred during complete cooking, the frequency of plugs 36 could be reduced relative to the flow rate.

This is achieved by selecting an appropriate speed of rotation of the gear 64 and thus the frequency of plug insertion. The freedom to vary the number of plugs that are inserted per unit of elapsed time totally independently of the product flow rate established by pump 30 permits the operator to adjust the system to achieve optimum results with products of many diverse characteristics.

This type of system is particularly well-suited for the preparation of sausages that enter the system in the form of an emulsion from the stuffing machine 30. The sausages may be either completely or only partially cooked using the system of the present invention, such flexibility being one of its highly desirable advantages. In either case, the sausages will be at least in a semisolid state upon leaving the system so as to permit the use of the retrieval arrangement for plugs 36 which utilizes the conveyors 52 and 56.

Normally, the sausage emulsion may enter the system from stuffer 30 at approximately 45° F. The emulsion is then brought up to approximately 165° during its passage through tube 10 (in the event that it is to be fully cooked), and after remaining at that temperature for a predetermined amount of time, is then cooled to a temperature of approximately 120° before being discharged. It is most desirable that such cooling take place while the sausage remains within tube 10 in the pressurized atmosphere it affords, since if the sausage were immediately ejected from such atmosphere during the time it is still at the cooking temperature, blisters could form on the sausage, detracting from its salability. In this respect, then, it might be desirable to utilize a hot medium within jackets 12 throughout the cooking length of tube 10, while flowing a cool heat transfer medium through jackets 12 adjacent the discharge end of tube 10.

It is to be noted that the system of my invention provides continuous movement of the product without any reversing movement or subjection to substantial shear stresses which could seriously damage the product. The pumping force applied by stuffer 30 can be continuous in nature instead of pulsating such that product flows into tube 10 on a continuous basis at a uniform rate. There is no need to temporarily stop advancement as plugs 36 are loaded, since they can be quickly injected into the tube 10 at the same rate that the product is moving through the latter. Such continuous movement is desirable in as much as it prevents the product from sitting motionless at an area of high temperature.

It should also be appreciated that use of the scraping plugs 36 in the manner described enables the tube 10 to have rigid walls. This permits tube 10 to be constructed from a material such as stainless steel having excellent heat transfer properties, and also allows the system to operate under considerably higher pressures than would otherwise be possible. Such higher pressures are desirable because they create a faster cooking rate and permit the product to be forced through a much longer path of travel in tube 10. Hence, the product can be kept within tube 10 a longer period of time and can be cooked more completely.

The use of rigid walls for tube 10 is also desirable because it will maintain the product where it is emulsified, such as with sausages, in a uniform cross section throughout the processing period. This is particularly desirable where sausages are cut into uniform lengths following the cooking cycle and are subsequently placed in packages stating the weight of the sausages produced. If the cross-sectional size of the sausages is allowed to vary, inaccurate packaging weight will result in spite of the fact that the sausages may be consistently of one length. On the other hand, the sausage or other substance is relatively free to expand or contract longitudinally during cooking or cooling inasmuch as the plugs 36 present no positive, fixed barriers preventing such expansion or contraction. For example, if a section of the sausage between plugs needs to expand or contract, the plugs can simply be displaced an appropriate amount against the next leading or trailing sausage section, slight relative rearward displacement occurring during contraction and slight relative forward displacement occurring during expansion. However, the overall movement of the product and the plugs is in one direction only. This is in the direction of the longitudinal axis of the tube.

The frequency of plug insertion affects the "portion" size of the product issuing from the discharge end of the system. That is, the frequency of plug insertion at a given flow rate determines the size of the portions between respective pairs of the plugs 36. This can be significant with regard to packaging quantities and sizes. A conventional proximity switch could be provided along the tube 10 which would respond to the passage of a ferrous insert in a plug 36 by commanding the loader 62 to place the next plug into the system, thus rendering the procedure automatic. Thus, frequency of plug insertion can be used to determine portion size (coordinated, of course, with cooking or chilling factors).

The temperature differential necessary to cook or otherwise heat the product need not necessarily be developed by an externally circulated fluid. While such a fluid is in many situations preferred, other sources can be utilized within the scope of the present invention. For example, microwave energy can be applied to the produce from an energy source alongside tube 10, in which event the cooking proceeds "from the inside out," rather than "from the outside in," as in the earlier examples. Even though the energy source is outside the tube 10, the innermost parts of the product are the first to be heated and cooked, followed by the outer portions.

Because microwave cooking progresses in this manner, the tendency for material to adhere to the inside of tube 10 is very slight, the tube 10 being the last to receive the heating effects of the microwave energy. In the event microwave energy is utilized, the scraping action provided by plugs 36 is still important, not so much for removing material from the tube walls as for assuring that the product portions are physically isolated from one another throughout their travel in tube 10 to maintain size integrity. The effective seals provided at opposite scraping ends of the plugs 36 make this possible. Moreover, it is not unlikely that microwave energy might be combined with other heating means which cause the tube walls to rise in temperature, in which event the cleaning action provided by plugs 36 once again becomes important.

Having thus described the invention, what is claimed as new and desired to be secured by Letters Patent is:

1. A method of cooking a flowable food product that includes the steps of:

forcing the product under pressure through a thermally conductive tube having a substantially rigid, annular wall;

heating said wall of the tube so that the temperature of the product will be raised as the product flows through the tube, the amount of heat supplied to the tube being sufficient to cause some of the product to adhere to the wall if such adherence is not otherwise prevented;

continuing to force the product through the tube and to expose the same to said heated wall thereof for a predetermined length of time;

maintaining a supply of individual scraping plugs outside of said tube, each of which has an external dimension substantially corresponding to the transverse, internal dimension of said tube;

continuously inserting said plugs in succession into said tube for continuous flow with the product at spaced intervals in the latter;

advancing the plugs and the product together through the tube at the same rate and with the plugs scraping said wall;

controlling the rate of product and plug flow with a first control means;

controlling the frequency of plug insertion with a second control means operating independently of said first control means so that, although the plugs and product move together through the tube at the same rate of flow, the frequency of plug insertion may be varied independently of and without affecting the flow rate of the product and plugs in accordance with the frequency of scraping needed to maintain the wall substantially free of accumulations of the product;

restricting the movement of product and plugs to advance continuously through the tube to one direction only with respect to the longitudinal axis of the tube; removing product from the tube that has been exposed to the heated wall for said predetermined length of time; and removing the plugs in succession from the tube when their movement with the product has been completed, said step of controlling the frequency of plug insertion independently of the rate of product and plug flow including obtaining portions of the cooked product of a size that corresponds to said frequency of plug insertion.

2. A cooking method as claimed in claim 1; and the additional step of cooling product that has been exposed to the heated wall for said predetermined length of time before removing the same from the tube.

3. In a cooking method as claimed in claim 1, wherein the temperature differential is obtained by flowing a heat transfer medium around the tube having a higher temperature than the product.

4. In a cooking method as claimed in claim 3, wherein said heat transfer medium is flowed counter to the direction of product flow.

5. In a cooking method as claimed in claim 4, wherein said heat transfer medium is presented to the tube in a number of individual flow systems along the tube, each having its own inlet and outlet for the medium separate from those of the other systems.

6. In a cooking method as claimed in claim 4, wherein said heat transfer medium is guided in a helical path of travel around the tube.

7. A method of successively cooking two different flowable food products that includes the steps of:

forcing the first product under pressure through a thermally conductive tube having a substantially rigid, annular wall;

heating said wall of the tube so that the temperature of the first product will be raised as the first product flows through the tube, the amount of heat supplied to the tube being sufficient to cause some of the first product to adhere to wall if such adherence is not otherwise prevented;

continuing to force the first product through the tube and to expose the same to said heated wall thereof for a predetermined length of time;

maintaining a supply of individual scraping plugs outside of said tube, each of which has an external dimension substantially corresponding to the transverse, internal dimension of said tube;

continuously inserting said plugs in succession into said tube for continuous flow with the first product at spaced intervals in the latter;

advancing the plugs and the first product together through the tube at the same rate and with the plugs scraping said wall;

controlling the rate of first product and plug flow with a first control means;

controlling the frequency of plug insertion with a second control means operating independently of said first control means so that, although the plugs and first product move together through the tube at the same rate of flow, the frequency of plug insertion may be varied independently of and without affecting the flow rate of the first product and plugs in accordance with the frequency of scraping needed to maintain the wall substantially free of accumulations of the first product;

restricting the movement of first product and plugs to advance continuously through the tube in one direction only with respect to the longitudinal axis of the tube;
removing first product from the tube that has been exposed to the heated wall for said predetermined length of time;
removing the plugs in succession from the tube when their movement with the first product has been completed; and
then repeating the foregoing steps with the second product but using the same said tube,
said controlling steps for the second product including, with respect to their corresponding values for the first product, adjusting the frequency of plug insertion and adjusting the rate of product and plug flow to the extent necessary to maintain the wall substantially free of accumulations of the second product for each respective product said step of controlling the frequency of plug insertion independently of the rate of product and plug flow including obtaining portions of the cooked product of a size that corresponds to said frequency of plug insertion.

* * * * *